Figure 1:
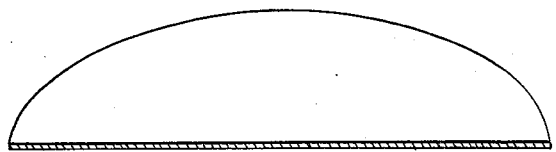

(No Model.)

J. S. CORBIN.
HARDENING HARROW DISKS.

No. 506,671.        Patented Oct. 17, 1893.

Witnesses.
H. S. Young
E. R. Case

Inventor:
J. S. Corbin
by
Fetherstonhaugh & Co.
attys

United States Patent Office.

JAY SPENCER CORBIN, OF PRESCOTT, CANADA.

HARDENING HARROW-DISKS.

SPECIFICATION forming part of Letters Patent No. 506,671, dated October 17, 1893.

Application filed February 14, 1893. Serial No. 462,261. (No specimens.)

*To all whom it may concern:*

Be it known that I, JAY SPENCER CORBIN, manufacturer, of the town of Prescott, in the county of Grenville, in the Province of Ontario, Canada, have invented certain new and useful Improvements in the Tempering of Steel Disks, of which the following is a specification.

My invention relates to a method of and apparatus for tempering what are known in the art as "harrow disks" and has for its object the devising of a process and apparatus by which the peripheral cutting edge of the disk may be hardened, so as to withstand the abrasive effect of the soil and yet at the same time leave the central portion of the disk soft and thereby avoid any danger of the disk being broken when in use, and it consists essentially in the method or process and apparatus hereinafter described and more particularly pointed out in the claims.

It is well known that in disk harrows the disks are used in gangs, which gangs are drawn over the surface at an angle to the line of draft. The direction of the draft produces a strong side strain on the disk which has very often the effect of breaking it.

It has been customary heretofore to make disks of mild steel sufficiently soft to be readily worked with a cutting tool in a lathe. Disks of this temper are found to be sufficiently tough and strong at the center to endure the necessary strain. Such disks are so soft at the periphery that the edge soon dulls and requires re-sharpening. Repeated attempts have been made heretofore to harden the cutting edge while the balance of the disk was left in its original softness, but until my invention I believe it has been impossible to so temper them without distorting and warping them. As a warped disk necessarily wobbles when mounted in a gang it is very difficult to scrape on account of the scrapers for each disk being mounted on an inelastic or rigid bar. It is further objectionable from its increased liability to clog upon that sector of the peripheral edge most nearly approaching its neighboring disk. Besides this a wobbling disk presents a most unmechanical appearance.

I am aware that disks have been hammer-hardened skin-deep by a process of sharpening namely by drawing down the edge to the necessary sharpness by blows of a hammer. This method, however, either puckers the edge, or warps the disk if done after the disk is pressed to a concavo-convex form, while if hammered previous to pressing, the heating necessary to be done before pressing destroys the hardness caused by compacting under the hammer. I believe I am the first to produce a disk hardened upon its periphery by heating and dipping and at the same time preserving the disk from being warped or distorted from a true concavo-convex shape. A flat disk cannot be tempered without warping. It must be concaved to allow for contraction of the periphery in cooling. Otherwise it will warp or buckle.

I shall now describe the manner in which the necessary hardness is imparted to the edge while the central portion of the disk is left soft but tough.

Figure 2:
Figure 3:
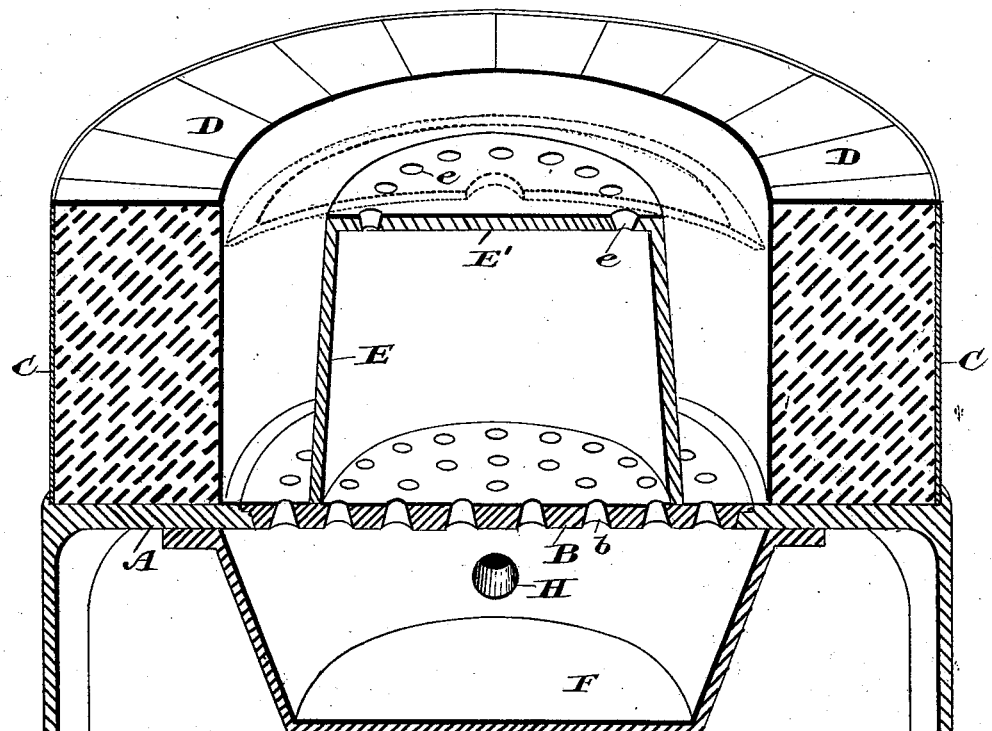

Figure 1, is a sectional perspective view of a steel disk before being formed up into shape. Fig. 2, is a sectional perspective view when formed up into shape and sharpened. Fig. 3, is a sectional perspective view showing the apparatus with annular fire pot by which my disks are tempered.

In the drawings like letters of reference indicate corresponding parts in each figure.

Before placing the disk in position as shown in dotted lines in Fig. 3, the circular plate shown in Fig. 1, of low carbon steel is heated evenly to a red color and placed in a drop-hammer having a convex die and concave drop by which it is stamped into a true concavo-convex or analogous form. The disk is then sharpened in the lathe by cutting a broad bevel on its convex side and a narrow bevel on its concave side and thus forming a sharp peripheral edge as shown in Fig. 2.

In Fig. 3, A, is the base of my annular fire pot which is provided with a circular grate, B. Extending upwardly from the base A, is the cylindrical casing or shell, C, which is fitted with fire bricks, D, as shown, which form the fire box of the annular fire. I locate upon the circular grate a hollow center, E, of cast iron around which the annular fire is formed. The circular grate, B, has air holes, *b*, as shown. The center, E, of the annular fire pot is in the form of a frustum of a cone and hollow as shown and provided at the top, E', with a circle of holes, e. Outside the center I build a fire of hard coal. Beneath the base A, and secured to it I locate the ash-box or air-box, F.

H, is a blast pipe which enters the air-box, F, as shown.

On applying the blast it will be seen that a portion of it passes upwardly through the fire and a portion into the hollow central portion, E, and through a circle of air holes in its top. The current of air passing up through the hollow central portion, E, will keep it cool and preserve it from destruction by the fire around it. The disk is laid as indicated by dotted lines in Fig. 3, upon the top of the cone-frustum shaped hollow center so that its edge overhangs the fire as indicated. When the blast is applied a continual draft is caused to ascend through the air holes in the circular grate, B, the hollow center, E, air holes e, and central hole of the disk. By this means all of the disk except the overhanging portion is kept cool by the blast during the period that the overhanging portion or edge is being subjected to the action of the heat from the fire.

It will be seen on reference to Fig. 3, that the holes in the top of the central portion, E, are made as near the edge of the top E', as possible in order to prevent the disk becoming hot except at its edge. This is very essential as all danger of warping is thereby prevented. After the peripheral edge of the disk has reached a low red heat the disk is removed and submerged in water and when cool the peripheral edge has acquired the temper desired while the central portion is soft and tough.

Although I show the hollow central portion, E, with air holes in order to keep the central portion of the disk cool while the peripheral edge is being heated it will of course be understood that other equivalent methods might be employed to accomplish this result. For instance a circular block of soap stone or other refractory material may be placed directly upon the burning coal and the disk placed upon such block with its edge overhanging. It will therefore be understood in this specification that I do not limit myself to the specific means shown for keeping the central portion of the disk cool while edge is being heated.

What I claim as my invention is—

1. The herein described method consisting in first pressing the disk to be hardened into a concavo-convex shape, then sharpening the edge of the same by beveling both sides thereof, then heating the beveled edge while the center is kept cool, and finally submerging the disk in cold water, substantially as described.

2. An improved means or apparatus for heating the peripheral edges of disks consisting in an annular fire pot comprised of the fire brick outer portion, circular grate and a central portion whereby the central portion of the disk placed thereon may be kept cool while the peripheral edge is being heated as and for the purpose specified.

3. The combination with the outer fire brick portion, D, and grate, B, provided with air holes, b, of the hollow cone-frustum shaped portion, E, provided with a circle of air holes, e, arranged as and for the purpose specified.

4. The combination with the outer fire brick portion, D, and grate, B, provided with air holes, b, of the hollow cone frustum shaped portion, E, provided with a circle of air holes, e, as specified and the air chamber, F, beneath the grate provided with a blast pipe, H, as and for the purpose specified.

JAY SPENCER CORBIN.

Witnesses:
T. E. BISSELL,
W. S. CORBIN.